Figure 1:
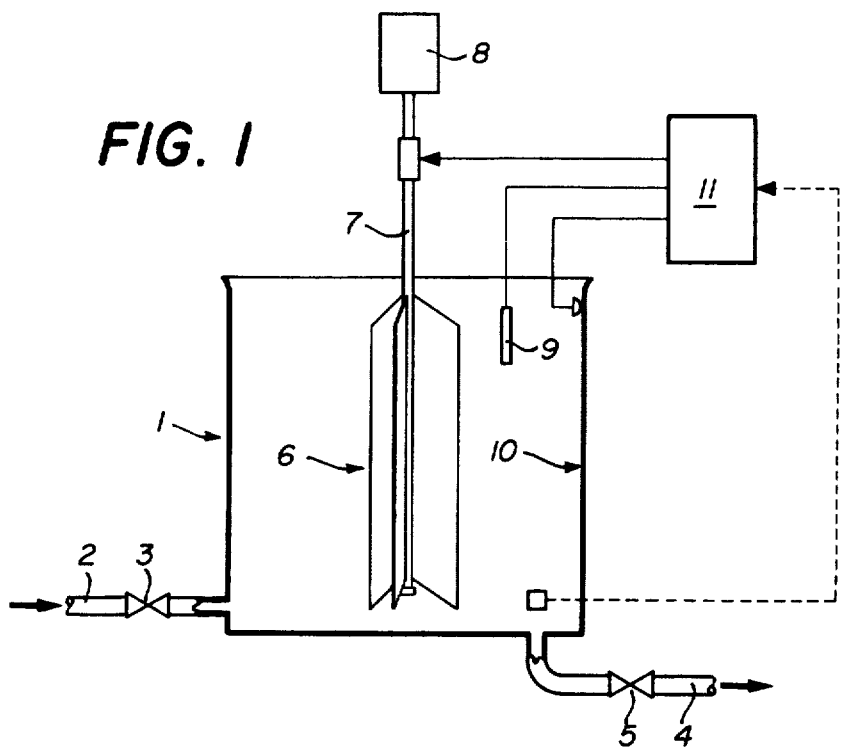

United States Patent [19]  
Fresnel et al.

[11] 3,919,052  
[45] Nov. 11, 1975

[54] METHOD AND APPARATUS FOR CONTINUOUSLY CONTROLLING AN ENZYMATIC REACTION

[75] Inventors: Jean Marie Fresnel, Haut-Thoiry, France; Daniéle Trosset, Carouge, Geneva, Switzerland

[73] Assignee: Battelle Memorial Institute, Switzerland

[22] Filed: Jan. 8, 1974

[21] Appl. No.: 431,608

[30] Foreign Application Priority Data
Jan. 10, 1973  Switzerland............ 259/73
Jan. 10, 1973  Switzerland............ 260/73

[52] U.S. Cl. .................. 195/115; 195/116
[51] Int. Cl.$^2$ ........................ C12B 1/00
[58] Field of Search .......... 195/68, 63, 103.5, 105, 195/115, 116, 117–118, DIG. 11; 204/195 B, 195 T

[56] References Cited
UNITED STATES PATENTS
3,542,662  11/1970  Hicks et al............. 195/103.5 X
3,623,960  11/1971  Williams............... 204/195 P
3,776,819  12/1973  Williams............... 204/195 B Primary Examiner—A. Louis Monacell  
Assistant Examiner—R. B. Penland  
Attorney, Agent, or Firm—Robert E. Burns; Emmanuel J. Lobato; Bruce L. Adams

[57] ABSTRACT

The invention relates to a control method and apparatus for carrying out enzymatic reactions at a constant rate. A liquid reaction medium containing a substance to be transformed by the desired reaction is contacted with an enzymatic electrode comprising the corresponding enzyme fixed on a solid electronically conductive support. Control of the enzymatic reaction is achieved by applying a potential to the enzymatic electrode and controlling the value of this potential during the reaction so as to compensate for variations in the reaction conditions and the enzyme activity and thereby ensure a constant reaction rate.

6 Claims, 2 Drawing Figures

METHOD AND APPARATUS FOR CONTINUOUSLY CONTROLLING AN ENZYMATIC REACTION

The present invention relates to the field of enzymatic catalysis and in particular to the control of enzymatic reations for industrial transformation processes.

As is known, there are various enzymatic catalysis reactions which have great practical interest, particularly in the field of manufacture or treatment of food products. These reactions are generally effected by adding suitable enzymes to the reaction medium and often proceed in a quite arbitrary manner. Indeed, such a procedure generally does not allow precise control of enzymatic reactions to be ensured, as is required in various industrial processes. It is thus most difficult to provide for manufacturing cycles including enzymatic reactions that proceed in a precisely predetermined manner, since the addition of free enzymes does not allow free control of the exact instant at which the reaction is made to begin, or of the reaction rate, or of the termination of the reaction. An approximate control of the enzymatic catalysis process is generally obtained by acting on the temperature, the concentration of the substrate to be transformed and the pH of the reaction medium. However the response time of such actions is quite long so that they do not by any means allow precise and rapid control of the enzymatic reaction.

As a matter of fact, the catalytic activity of enzymes as well as the reaction conditions may vary notably in the course of a prolonged reaction. It is consequently difficult to determine beforehand the precise amount of free enzymes which should be added to effect a desired transformation. This generally results in waste of a relatively important amount of enzyme. Further, although the presence of enzymes in the reaction product is generally undesirable, it is very difficult or even impossible to separate the free enzymes which have participated in the reaction.

It has thus been proposed to utilise enzymes which are fixed to organic or inorganic carriers. This allows repeated use of the fixed enzymes, increased stability thereof with regard to variations of the reaction conditions and an increase of their lifetime. However, the use of an enzyme carrier does not allow, per se, the loss of activity in the course of time to be remedied, this loss being due to variations of the reaction conditions, among other things.

It is thus currently difficult or even impossible to ensure precise and rapid control of an enzymatic reaction, in such a manner as to meet the various requirements of an industrial process, namely an economical, readily controlled and hence reproducible use of enzymes.

A main object of the present invention is to enable controlled enzymatic catalysis to be achieved in such a manner as to allow the various drawbacks mentioned above to be obviated.

The present invention thus provides for a method of continuously controlling an enzymatic reaction for the continuous transformation of a substance by means of an enzyme fixed to a solid carrier. This method comprises the steps of contacting a liquid reaction medium, containing the substance to be transformed, with an enzymatic electrode comprising said enzyme fixed on a solid, electronically conducting support, and applying a potential to said electrode while controlling the value of said potential during said reaction in such a manner as to transform said substance at a constant rate.

This method thus consists in effecting, so to speak, a controlled enzymatic "electrocatalysis" in such a manner as to permit the catalytic activity to be maintained at a constant level during long periods of utilisation of the said enzymatic electrode. Indeed, it thus becomes possible, thanks to this method, to also readily compensate various variations in the reaction medium, simply by controlling the potential of the enzymatic electrode so as to achieve a constant reaction rate. A readily reproducible transformation process is thus achieved so that a uniform final product can be obtained in a continuous or semicontinuous manner.

The values of the potential allowing control to be achieved will evidently depend on the desired reaction and more particularly on the nature of the enzymes as well as the reaction conditions provided for in each case. Now, a potential should be applied to the enzymatic electrode, which potential should be capable of providing, during a long period, a constant catalytic activity, higher than that of the enzyme which is fixed to the electrode but is not subjected to the action of a potential.

These values of the potential will thus be selected so as to be able to maintain an optimum activity of the enzymatic electrode during a long period. Now, this optimum activity will not generally correspond to the maximum activity that the electrode might be able to provide during a limited period. This can be explained by the fact that the activity of an enzyme generally diminishes in the course of time and under the influence of the variations, which are moreover inevitable, of the conditions under which the transformation is achieved in the course of the enzymatic reaction.

Preliminary, relatively simple tests will allow the must appropriate initial conditions (composition, pH, ionic strength and temperature of the reaction medium) to be determined, as well as the values of the potential which correspond to a satisfactory enzymatic activity and enable precise control for the reaction to proceed at a constant rate.

Control of the electrode potential, during the controlled reaction carried out in accordance with the present invention, then allows a constant catalytic effect to be achieved, in spite of diminution of the enzymatic activity due to deterioration of the enzyme in the course of time.

Now, when the potential level permits it, certain substances dissolved in the reaction medium may be oxidized or reduced on the enzymatic electrode and the products resulting therefrom may then themselves participate in the reaction which is catalyzed by the enzyme and may, for example, constitute the substrate to be transformed by the enzymatic reaction.

The invention further relates to an apparatus for carrying out a continuously controlled enzymatic reaction for continuously transforming a substance by means of an enzyme fixed on a solid carrier, comprising:

a. a reaction chamber which is adapted to receive a liquid reaction medium containing said substance and to discharge the products of said reaction;

b. at least one enzymatic electrode and a counter-electrode arranged in said reaction chamber, said enzymatic electrode comprising said enzyme fixed on an electronically conducting support; and c. electrical control means adapted to establish between said enzymatic electrode and said counter-electrode a potential difference having a value which is controllable in such manner as to cause said enzymatic reaction to proceed to a controlled constant rate.

Figure 2:
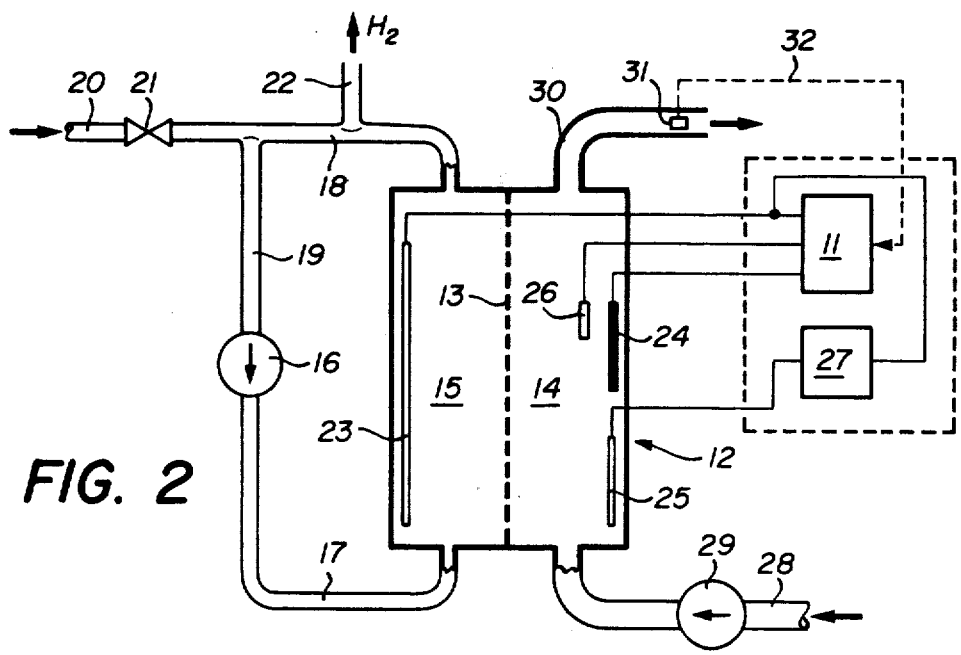

The invention is further explained in greater detail by means of the examples given below and of the accompanying drawing wherein:

FIG. 1 shows a schematic vertical section of an apparatus for carrying out the method according to example 2 below; and FIG. 2 shows a schematic section of an apparatus for carrying out the method according to example 3.

EXAMPLE 1

To produce a fruit juice substantially exempt of oxygen, so as to provide improved conservation thereof, an enzymatic oxidation is carried out according to the following reaction:

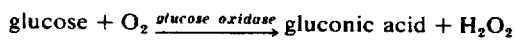

$$\text{glucose} + O_2 \xrightarrow{\text{glucose oxidase}} \text{gluconic acid} + H_2O_2$$

To this end, a syrup containing an excess of glucose is added to the fruit juice, in order to improve the flavour of the juice and to provide glucose in a sufficient amount to allow said oxidation to be effected, after rapid pasteurisation.

In the present case cherry juice is treated, which has a pH value of about 3.4, the activity of glucose oxidase being normally very slight at this pH value. Now, this activity is greatly increased and may be maintained constant when an electrocatalytic treatment is carried out in the manner described below.

After addition of glucose and pasteurisation, the cherry juice is placed in a reaction vessel which is maintained at 30°C and is equipped with an enzymatic electrode and with a counter-electrode made of stainless steel. The enzymatic electrode comprises a conducting support in the form of a porous plate of pyrolitic graphite, on which the enzymes glucose oxidase and catalase are fixed, by a covalent bond, by means of a polymer (polyacrylic acid).

The enzymatic electrode is then positively polarized by applying thereto a controllable over-tension (with respect to its equilibrium potential) in the course of the enzymatic oxidation of the glucose. Thus, with an over-tension of +100 mV, the activity of the glucose oxidase may attain a value several times higher than that which is achieved in the absence of this polarisation.

The oxidation reaction given above may proceed until the oxygen present in the cherry juice is consumed. The oxygen-content of the juice is controlled by means of an oxygen electrode of conventional type, the described "electroenzymatic" treatment being interrrupted by suppressing the polarization when the oxygen-content thus detected has decreased to a slight predetermined value. During this treatment, the role of the catalase is to decompose the $H_2O_2$, in order to once more form $H_2O + \frac{1}{2} O_2$.

The potentiel of the enzymatic electrode is controlled during the oxidation reaction, in such manner as to achieve a well controlled, almost complete deoxygenation of the juice.

Such as enzymatic electrode may be manufactured in the following manner:

The electrode support is first impregnated, under vacuum, with an aqueous solution of acrylic acid which has first been neutralized, then activated by Woodward K reagent.

The impregnated support is then contacted with an aqueous solution containing the enzymes, so as to form a covalent bond between the activated acrylic acid and the enzymes.

An electropolymerisation of the acrylic acid is finally effected, in acid medium, in an electrolysis vessel, by applying a voltage of 2 to 3 Volts between a positive electrode and the impregnated support, forming the negative electrode.

EXAMPLE 2

For the continuous preparation of cheese from pasteurised milk at 35°C, an enzymatic electrocatalysis treatment is carried out in the apparatus shown in FIG. 1.

This apparatus essentially comprises a stainless-steel fermentation vessel 1 provided with an inlet conduit 2 equipped with a valve 3, for supply of the pasteurized milk at 35°C and with an outlet conduit 4 for the curd, equipped with a valve 5. The vessel 1 is further equipped with an axial anode 6 consisting of an enzymatic electrode comprising several radial wings mounted on a vertical shaft 7 driven by a motor 8 so that the electrode at the same time constitutes a stirrer serving to agitate the milk during treatment in the vessel 1. Each of the wings of the enzymatic electrode 6 (anode) is formed of a conductive support on which the enzymes trypsin, pepsin and lipase are fixed, the structure of the support and the manner of fixation of the enzymes on the support being, in this case, analogous to those described in Example 1.

As is further seen in FIG. 1, a reference electrode 9 is associated with the anode 6 while the counter-electrode (cathode) is formed by the inner wall surface 10 of the vessel 1 itself. These electrodes 6, 9 and 10 are connected to a voltage source 11 serving to polarize the anode 6 by applying thereto a potential which is controlled as a function of a measurement effected during the reaction, as is indicated schematically by a dashed line in FIG. 1.

For effecting the enzymatic treatment, in the described apparatus, of 10,000 liters of pasteurized milk in 20 minutes, an anode 6 is utilized, on which the enzymes are fixed in amounts of: 1 kg of trypsin, 80 grams of pepsin and 15 grams of lipase, and the enzymatic reaction is made to begin by applying to the rotating anode a potential of + 80 mV with respect to its open circuit potential. The value of this potential is controlled during the reaction, via the source 11, so as to obtain the desired curd having constant properties.

Fixation of the enzymes on the anode 6 and polarization of the latter in a controlled manner, as described, allows the catalytic activity of the enzymes to be increased considerably and moreover to be maintained constant, whereby the desired enzymatic reactions may be carried out in a controlled, accelerated manner.

Moreover, the enzyme/milk ratio is relatively low, since control of the potential ensures increased activity of the electrode during a long time.

EXAMPLE 3

A treatment for glucose removal from eggs is carried out in order to allow improved preservation and to avoid a change of colour, when subsequently transformed to egg powder.

During this treatment, the following reactions are carried out:

a. Electrolysis of water $$2 H_2O \rightarrow 4 H^+ + 4 e^- + O_2$$

b. Glucose removal by oxidation $$O_2 + \text{glucose} \xrightarrow{\text{glucose oxidase}} \text{gluconic acid} + H_2O_2$$

A reactor as shown in FIG. 2 is used to carry out this treatment. This reactor 12 comprises two compartments of slight width and large surface, separated by a semi-permeable membrane 13, namely an anode compartment 14, on one hand, through which a liquid egg mass to be treated is passed, and a cathode compartment 15, on the other hand, which is connected to a water circulation circuit. This circuit comprises a pump 16 which causes water to flow through the cathode compartment 15 via an admission pipe 17 as well as an outlet pipe 18 and a recirculating pipe 19, which are connected to a water inlet 20 provided with a valve 21, on one hand, and to an outlet 22 for hydrogen formed during the hydrolysis of water. The compartment 15 is provided with a stainless-steel cathode 23 and the compartment 14 is provided with an enzymatic anode 24 comprising a graphite support having glucose oxidase fixed thereon. The compartment 14 is provided with an oxygen anode 25 and a reference electrode 26, the electrodes 23 to 26 being respectively connected to a controllable voltage source 11 and to a d.c. supply 27 with stabilized voltage. The inlet 28 for the egg to be treated is provided with a pump 29 and the outlet 30 for the deglucosed egg is provided with an instrument 31 for measuring a parameter of the reaction (e.g. glucose content) so as to permit control of the potential of the enzymatic electrode 24, in dependence on variations of this parameter, as is indicated schematically by a dashed line in FIG. 2.

During the enzymatic treatment, the supply 27 is controlled so as to establish a potential difference of 1,500 mV between the cathode 23 and the oxygen anode 25, and the enzymatic electrode 24 is polarized by means of the potentiostat 11 so as to apply thereto an initial overtension of + 60 mV with respect to its open-circuit voltage. The value of this potential is continuously controlled during this treatment so as to achieve glucose removal at a constant rate.

Alternatively, it is possible to achieve egg glucose removal with the reactor described above and shown in FIG. 2 but in a slightly modified form wherein the enzymatic anode 24 is utilized and is made to operate in a different manner, which allows elimination of the oxygen anode 25. To this end, a modulation of the polarization of this anode 24 is effected so as to cause periodic variation of the amplitude of its potential between a maximum of + 1,200 mV vs. SCE (i.e. with respect to a saturated calomel electrode) and a minimum of + 430 mV vs. SCE. Now, the glucose oxidase electrode 24 has a high catalytic activity at + 430 mV vs. SCE while at + 1,200 mV vs. SCE its activity is more or less nil and oxygen is given off by this electrode due to electrolysis of water. Cyclic operation of the enzymatic electrode 24 is thus obtained, which serves to alternately give off oxygen and to consume this oxygen for effecting the enzymatic oxidation of glucose to gluconic acid.

Such an enzymatic electrode 24 may be manufactured in the following manner:

The graphite support is first subjected to a chemical oxidation by contact with a concentrated sulpho-nitric mixture. This oxidation produces functional groups of the carboxyl, ketone, quinone and lactone types on the surface of the graphite.

The support thus oxidized is then activated by means of Woodward K reagent, then contacted with an aqueous solution of glucose oxidase in order to form a covalent bond between the activated carboxylic groups of the graphite and the amino groups of the enzyme.

Oxidation of the graphite support may likewise be achieved electrochemically in sulphuric acid medium, by subjecting the support to a potential of + 2 Volt with respect to a SCE electrode (saturated calomel electrode).

Alternatively, such a glucose oxidase electrode 24 may be manufactured in the following manner:

A porous graphite plate forming the electrode support is first prepared by hot-pressing during 10 minutes (at 600 kg./cm², 90°C) of a powder mixture composed of 80% by weight of graphite powder and 20% of a powder of an amide, in the present case an amide manufactured by Du Pont under the name Nylon 6. The latter is than hydrolyzed at the surface of the support by an aqueous HCl 4N solution.

The support is then contacted with a 12% aqueous solution of glutaraldehyde containing the enzyme oxidase dissolved therein, in order to form a covalent bond between this enzyme and the polymer which is activated by the glutaraldehyde.

EXAMPLE 4

In order to manufacture D(—) phenyl acetyl carbinol, which is the raw material utilized for manufacturing L(—) ephedrine, currently used as an antispasmodic, enzymatic electrocatalysis is carried out as described below.

The reaction of pyruvic acid on benzaldehyde produces phenyl acetyl carbinol. Catalysis of this reaction is achieved in the present case by means of an enzymatic electrode on which the enzyme carboxylase is fixed on a graphite support, in contact with the reaction medium.

This enzymatic electrode is polarized in such manner as to control the said reaction as it proceeds. Thanks to the addition, to the reaction medium, of acetaldehyde which plays the role of a competitive inhibitor, the secondary reaction of reduction of the benzaldehyde is considerably slowed down. The yield of phenyl acetyl carbinol is thus increased by about 50% and attains 70%. 900 milligrams of carboxylase fixed on this electrode allows controlled catalysis of the reaction to be achieved so as to obtain 1 kilogram of D(—) phenyl acetyl carbinol per minute.

It is understood that the support of the enzymatic electrode need not necessarily be made of graphite. As a matter of fact, this support may be made of any other appropriate conducting material, for example of metal, so long as its surface permits fixing of the enzymes by direct or indirect bonding, as is described herein before by way of example. The material, the form and the dimensions of the support may be readily adapted from case to case to the intended utilization of the enzymatic electrode. It is understood that the conducting material of the support must be, as far as possible, inert with regard to the reaction medium and must not have any undesirable effect on the catalytic activity of the enzyme fixed thereon.

It is likewise understood that enzymatic electrodes utilized in accordance with the present invention may comprise one or more enzymes of any desired type, the invention being by no means limited to the above examples. The choice of the enzymes will evidently depend from case to case on the particular application which is envisaged. Further, fixation of the exzyme on the support may be achieved by any suitable activation treatment of the surface of the conducting support, so as to form free functional groups thereon, which permit fixation of the enzymes in an insoluble manner on the support by means of a covalent, direct or indirect bond.

The techniques and means utilized for ensuring fixation and insolubilization of the enzymes by chemical, electrochemical or physical methods may be chosen from case to case and are not limited to the examples given above.

The invention is of particular interest in the field of reactions, which are catalyzed by oxido-reductases, intended for processes for manufacturing and treatment of products on an industrial scale (see examples 1 and 3 above).

Moreover, as appears particularly from examples 2 and 4 above, process control as achieved in accordance with the invention is of industrial interest in a broad range of manufacturing and treatment processes which are carried out by means of enzymes belonging to other classes.

The method according to the present invention may thus be advantageously utilized in various industrial applications requiring enzymatic catalysis of given reactions to be achieved in a well controlled manner. Indeed, the potential of the enzymatic electrode can have values which may be determined beforehand for each application, whereby to allow control of the catalytic action exerted by the enzyme with considerable increase thereof.

Control of the electrode potential, in accordance with the present invention, thus allows, by itself, rapid and precise control of one or more enzymatic reactions to be achieved (see examples 1 and 2) and thereby to maintain constant the production rate as well as the quality of the reaction products.

Moreover, control of the potential of an electrode comprising a given fixed enzyme may allow the specificity of this enzyme to be modified, if need be. Hence it would become possible to utilize a single enzyme fixed on an electrode and to control the potential of the electrode in such a manner as to ensure satisfactory transformations of various substrates having analogous or similar structures.

We claim:

1. A method of governing the reaction rate of enzymatic reactions wherein a substrate is continuously transformed by contact with at least one enzyme fixed to a solid carrier, said method comprising the steps of:
   a. providing an enzymatic electrode with at least one enzyme fixed to the surface of a solid electronically conductive enzyme support
   b. contacting a liquid reaction medium substrate, containing substances to be transformed, with said enzymatic electrode; and
   c. regulating the catalytic activity of said enzyme by applying a potential to said electrode while adjusting the value of said potential in such a manner as to transform said substrate substances at a substantially uniform rate.

2. A method as defined in claim 1 for the simultaneous control of several enzymatic reactions, wherein the reaction substrate medium, containing substances to be each transformed by at least one of said reactions, is contacted with the enzymes fixed on at least one enzymatic electrode, and wherein the potential of said electrode is continuously adjusted in a manner that each of said substances on contact with said enzymatic electrodes is transformed at a constant rate.

3. A method as defined in claim 1 wherein said enzymatic electrode is alternately brought to a first potential and to a second potential which respectively provide electro-chemical reactions; said first potential producing a substance participating in the desired enzymatic reaction and said second potential promoting the catalysis of this enzymatic reaction, and wherein the value of said second potential is adjusted so that the enzymatic reaction is caused to proceed at a constant rate.

4. A method as defined in claim 3, for controlling an enzymatic oxidation reaction, wherein an aqueous reaction medium, containing the substance to be oxidized, is contacted with said enzymatic electrode, which comprises an oxidase fixed on the support of said electrode, wherein said electrode is alternately brought to a first potential and to a second potential which first potential causes electrolysis of the water, to thereby generate oxygen on said electrode, and the enzymatic oxidation of said substance through the oxygen thus generated, and wherein said second potential is controlled in such manner that the enzymatic oxidation is caused to proceed at a constant rate.

5. An apparatus for governing the reaction rate of an enzymatic reaction comprising:
   a. at least one enzymatic electrode having at least one enzyme fixed to the surface of a solid, electronically conductive support connected to means to apply an adjustable electrical potential to said electrode;
   b. a reaction chamber which contains said enzymatic electrode associated with a counter-electrode and is adapted to receive said liquid reaction medium for contact with said electrodes and to discharge the products of the enzymatic reaction; and
   c. adjustable electrical supply and voltage control means connected to said enzymatic electrode and to said counter-electrode and adapted to apply, between said electrodes, a variable potential difference which is adjustable so as to regulate the activity of said enzyme on said medium.

6. An apparatus as defined in claim 5, further comprising a reference electrode which is arranged in the vicinity of said enzymatic electrode and is associated with said control means so as to provide a fixed potential value as a reference for controlling the potential of said enzymatic electrode.

* * * * *